(12) United States Patent
Keeley, II (10) Patent No.: US 11,794,518 B2
(45) Date of Patent: Oct. 24, 2023

(54) FREECOASTER HUB SYSTEM FOR A BICYCLE

(71) Applicant: Daniel Patrick Keeley, II, Fort Lauderdale, FL (US)

(72) Inventor: Daniel Patrick Keeley, II, Fort Lauderdale, FL (US)

( * ) Notice: Subject to any disclaimer, the term of this patent is extended or adjusted under 35 U.S.C. 154(b) by 262 days.

(21) Appl. No.: 17/194,965

(22) Filed: Mar. 8, 2021

(65) Prior Publication Data

US 2021/0283950 A1 Sep. 16, 2021

Related U.S. Application Data

(60) Provisional application No. 62/987,629, filed on Mar. 10, 2020.

(51) Int. Cl.
*B60B 27/04* (2006.01)
*F16D 41/30* (2006.01)
*B60B 27/02* (2006.01)
*B60B 27/00* (2006.01)
*B62M 9/02* (2006.01)

(52) U.S. Cl.
CPC ........ *B60B 27/047* (2013.01); *B60B 27/0026* (2013.01); *B60B 27/023* (2013.01); *B62M 9/02* (2013.01); *F16D 41/30* (2013.01)

(58) Field of Classification Search
CPC . B60B 27/047; B60B 27/0026; B60B 27/023; B62M 9/02; F16D 41/30
See application file for complete search history.

(56) References Cited

U.S. PATENT DOCUMENTS

| 2,799,183 | A | * | 7/1957 | Rhein | B62L 5/02 475/900 |
|---|---|---|---|---|---|
| 2010/0252389 | A1 | * | 10/2010 | French | F16D 41/24 192/64 |
| 2011/0061490 | A1 | * | 3/2011 | Chen | F16D 41/30 74/576 |
| 2013/0299295 | A1 | * | 11/2013 | Yang | F16D 41/30 192/64 |
| 2016/0186821 | A1 | * | 6/2016 | Alley | F16D 41/26 192/45.1 |
| 2017/0101161 | A1 | * | 4/2017 | Cohen | B62M 3/00 |

* cited by examiner

*Primary Examiner* — S. Joseph Morano
*Assistant Examiner* — Emily G. Castonguay (57) ABSTRACT

A freecoaster hub system for a bicycle allows the bicycle to coast freely in either a forward or backward direction. The freecoaster hub system includes a hub assembly having a hub and an axle, wherein the hub is interconnected to the rim of a wheel of the bicycle by a plurality of spokes. The freecoaster hub system for a bicycle also includes a transmission assembly at least partially mounted in the hub and operatively interconnected to the axle and the hub. The transmission assembly comprising a drive assembly and an engagement assembly, each of which operatively engage the axle and or hub.

5 Claims, 6 Drawing Sheets

DISENGAGED

FIG 3 B

ENGAGED

FREECOASTER HUB SYSTEM FOR A BICYCLE

BACKGROUND OF THE INVENTION

Field of the Invention

The present invention is directed to a freecoaster hub system for a bicycle. More in particular, the present invention is directed to a freecoaster hub system which allows the bicycle to coast freely in either a forward or backward direction, and which provides a readily adjustable slack angle, the slack angle at least partially defined by the degrees of rotation of the bicycle pedals between a disengaged orientation and an engaged orientation of the present freecoaster hub system for a bicycle.

Description of the Related Art

Bicycles have a number of simple machines included in their wheels, pedals, gears and brakes that enable the bicycle to move. The bicycle hub is the main part of the bicycle wheel, it connects the axle with the wheel's rim via a set of spokes. The front hub provides a smooth rotating surface for wheel rotation, which includes bearings to minimize friction in addition to maintaining the tension between the spokes and the rim. The hub handles intense static and dynamic loads created by the road, rider and spoke tension.

The rear hub is a more complicated machine. The rear hub also handles load distribution and enables the wheel to spin, but most importantly, it allows the bicycle to move. It is equipped with a sprocket that is turned by the crank and pedal system positioned at the center of the bicycle. As the rider pushes downward on the pedals, the dynamic load turns the cranks into a lever and rotates. The cranks transfer the motion onto a sprocket fixed to the crank base. A chain mounted on the sprocket turns forward with the sprocket and is connected to the rear hub by a smaller sprocket. When the rear hub is turned the rear wheel turns and propels the entire bicycle forward. The hub system is designed in multiple ways depending on the end use of the bicycle, i.e., fixed, freewheel, cassette or freecoaster.

Fixed hubs are permanently engaged to the drive system. The rider is not able to stop pedaling or coast because the hub is in continuous motion when the sprocket rotates. This design aims to balance spoke tension and provide immediate acceleration.

Freewheel hubs are designed with a ratchet and pawl system screwed to the body of the hub such that when the rider stops pedaling forward the bicycle continues to move forward but the rider is able to have their feet resting still on the pedals or "coast". The hub has a ratchet system that will only engage when the pedal motion is the forward direction allowing the rider to pedal backwards freely but not ride backwards. The design aims to provide virtually immediately acceleration, while allowing the rider to "coast" A cassette hub, which has a similar ratchet and pawl system as the aforementioned freewheel hub, however, it is installed on the inside of the hub instead of in the exterior of the hub.

Typically, a hub body has a ratchet ring with teeth and the driver has pawls acting as levers, wherein each pawl is slotted to accommodate a spring. The springs hold the pawls mechanism in place so that it can engage with the ratchet. Pawls are always engaged so that the bicycle cannot coast backwards (role backwards without the cranks moving). One of the advantages is that there is no side load applied to the mechanism.

Intrinsic to BMX type bicycles is the ability to perform tricks that enable to rider to coast backwards for long periods challenging the rider's balance. In addition, it is desirable to have a delayed response when the pedal is pressed for the forward motion to start. The hub design needs to be more versatile, adjustable and durable than conventional hubs.

As such, many BMX riders prefer freecoaster hubs. The standard freecoaster hub design used in BMX industry today uses a clutch system. The system includes an internal clutch cylinder with female threads and a driver with male threads. As cranks turn rotating the driver, it screws into the clutch cylinder, sliding the clutch cylinder axially wedging it into the hub body thereby rotating the wheel. When the rider pedals backwards, the driver unscrews from the clutch cylinder releasing it from the hub shell and the wheel is able to rotate freely in both directions. The rider is able to coast backwards unlike the cassette or freewheel hub designs.

Slack is the amount of rotation of the cranks before the hub engages. The slack can be adjusted by increasing the distance between the clutch cylinder and the driver. The longer it takes for the driver to screw into the cylinder the more rotation that needs to be applied to the crank before the hub engages. The spacing is typically modified by inserting washers between a stopper in the axle and the clutch cylinder.

The advantage of the standard freecoaster hub design is that there are no teeth or pawls that engage to propel the wheel forward, instead, the clutch engages the hub by the friction created between the clutch and the shell. There is no slip or delay with this system.

Major disadvantages of the standard freecoaster hub are that to increase the slack the entire hub needs to be disassembled, the hub needs to be serviced regularly and coated with grease and the excessive side load applied to the face of the hub by screwing/unscrewing on to the cylinder causing bearing failure.

Thus, it would be extremely beneficial to provide a freecoaster hub assembly for a bicycle wherein the slack may be quickly and easily adjusted without disassembly of the entire hub assembly. It would be further advantageous to provide a freecoaster hub which does not require springs to maintain pawls in an operative or disengaged position.

SUMMARY OF THE INVENTION

The present invention is directed to a freecoaster hub system for a bicycle allows the bicycle to coast freely in either a forward or backward direction. In at least one embodiment, a freecoaster hub system comprises a hub assembly having a hub and an axle, wherein the axle is interconnected to the hub, and the hub is interconnected to the wheel of the bicycle by a series of spokes.

A freecoaster hub system for a bicycle in accordance with one further embodiment of the present invention includes a transmission assembly which is at least partially mounted in the hub and operatively interconnected to the axle. More in particular, a transmission assembly comprises a drive assembly having a drive member operative with the axle, and in at least one embodiment, a drive member has a sprocket on one side dimensioned to receive a portion of a bicycle chain in a driving relation there around. In one further embodiment, a drive member also includes a pawl support member on a side opposite the sprocket.

In at least one embodiment of the present invention, a drive assembly comprises a plurality of pawls operatively positioned in the pawl support member, wherein each of the plurality of pawls is disposable between a retracted freecoaster orientation, and an outwardly extended driving orientation, relative to a ratchet member of the drive assembly. More in particular, in one embodiment, a drive assembly comprises a ratchet member interconnected to the hub, wherein the ratchet member comprising a plurality of ratchet slots each dimensioned to receive a portion of a different one of the plurality of pawls therein while the plurality of pawls are disposed in the outwardly extended driving orientation, thereby causing the ratchet member to rotate in a forward direction while the drive member is rotated in a forward direction.

A transmission assembly in accordance with at least one embodiment of the present invention further comprising an engagement assembly having an inner member and an outer member disposed in a rotational configuration relative to the inner member between an engaged orientation and a disengaged orientation. In one further embodiment, an inner member comprises an inner stop and an outer member comprises a fixed stop, the inner stop engages the fixed stop to limit rotation of the outer member. In addition, in at least one embodiment, an outer member includes a slack adjustment pin and one or more slack adjustment pin slot, wherein the slack adjustment pin is disposable into any of the one or more slack adjustment pin slots. In a further embodiment, an inner stop engages a slack adjustment pin while an inner member and outer member are disposed in an engaged orientation.

A slack engagement angle is at least partially defined by a distance between a fixed stop and a preselected one of said plurality of slack adjustment pin slots in which a slack adjustment pin is disposed. In at least one embodiment of the present invention, a slack engagement angle is further defined by the degrees of rotation of the bicycle pedals between a disengaged orientation and an engaged orientation of an inner member and an outer member of an engagement assembly.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
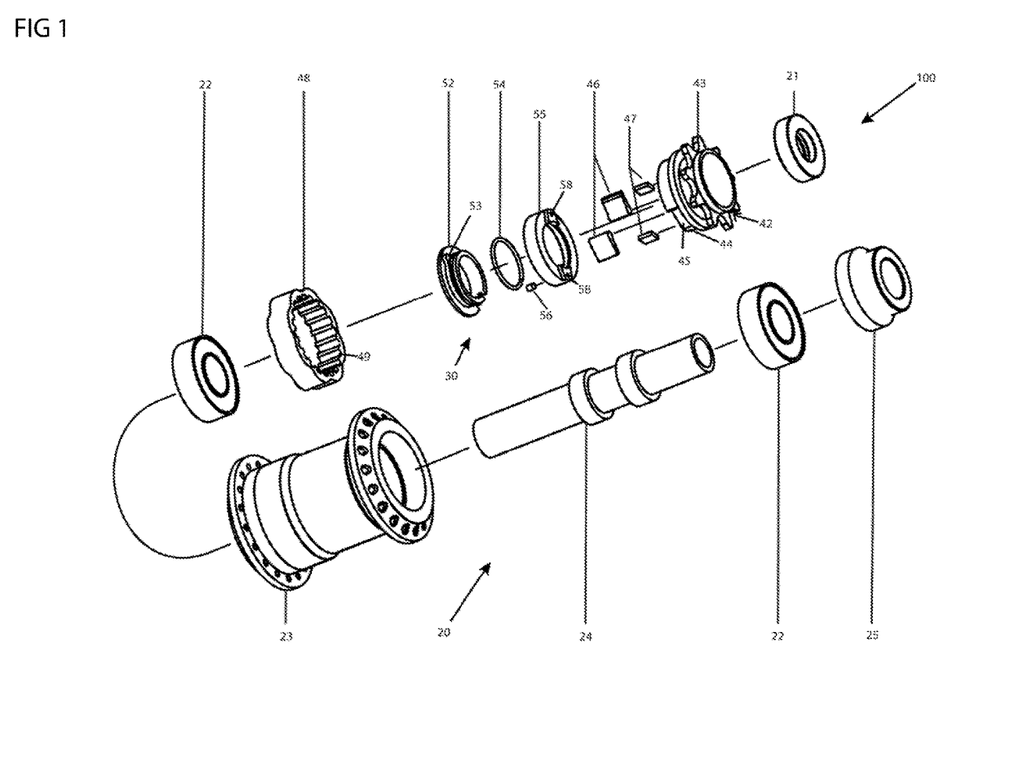
FIG. 1 is an exploded perspective view of a freecoaster hub system for a bicycle in accordance with the present invention.

As before, the present invention is directed to a freecoaster hub system for a bicycle, generally as shown as at 100 throughout the figures. With reference to the illustrative embodiment of FIG. 1, which presents an exploded perspective view of a freecoaster hub system for a bicycle 100 in accordance with the present invention, the freecoaster hub system 100 comprises a hub assembly 20 and a transmission assembly 30. More in particular, a hub assembly 20 in accordance with at least one embodiment of the present invention includes end caps 21 and 25 which are secured at opposite ends of an axle 24, operatively disposed through a hub 23, via any of a number of known mechanical fastening mechanisms including, but not limited to, O-rings, set screws, etc. End caps 21 and 25 serve to retain bearings 22 in an operative position disposed along opposite ends of the axle 24. As will be appreciated by those of skill in the art, the end caps 21 and 25 further serve to retain the components of a transmission assembly 30 in an operative engagement with a hub assembly 20, and in particular, with an axle 24. Lastly, in at least one embodiment of the present invention, a hub 23 serves to interconnect the freecoaster hub system 100 to a rim of a wheel of a bicycle via a plurality of spokes. As will be further appreciated by those of skill in the art, in at least one embodiment, the hub 23 serves as a housing for the components of a transmission assembly 30 of a freecoaster hub system for a bicycle 100 in accordance with the present invention.

Figure 4:
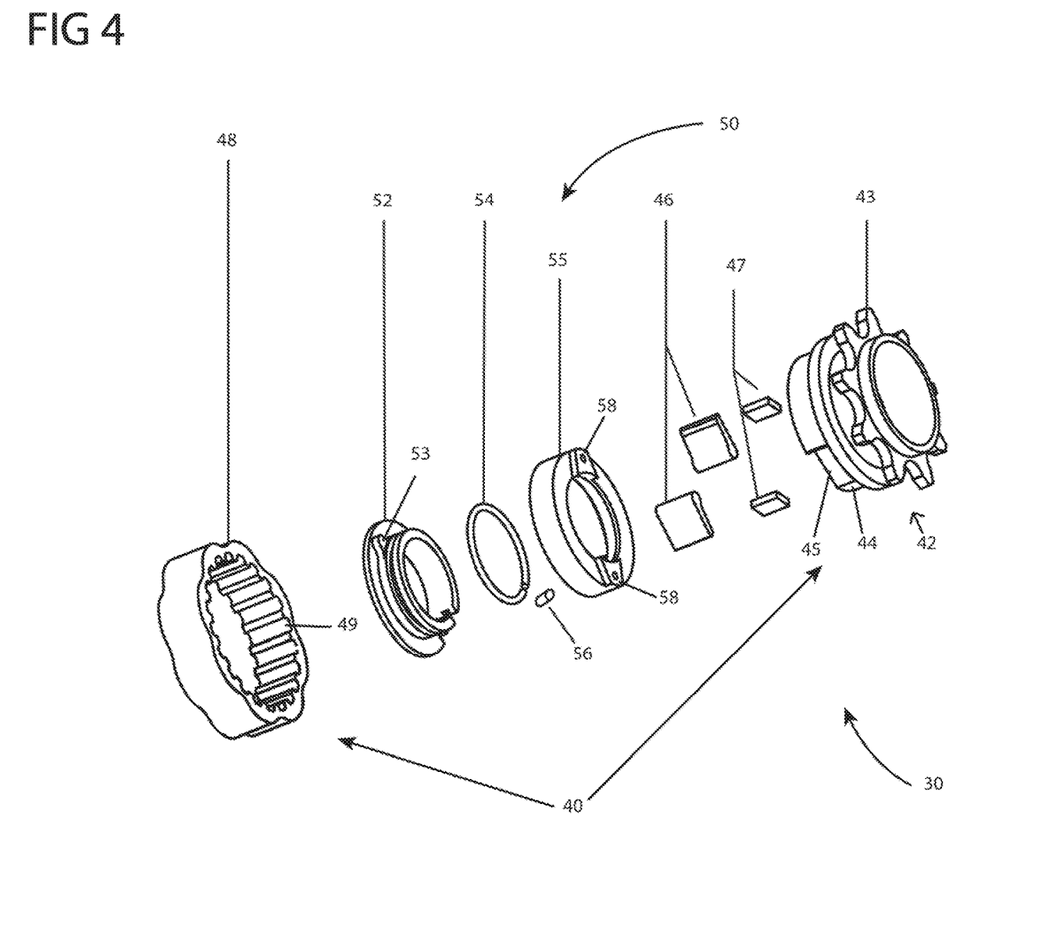
FIG. 4 is an exploded perspective view in one direction of one illustrative embodiment of a transmission assembly in accordance with the present invention.
Figure 5:
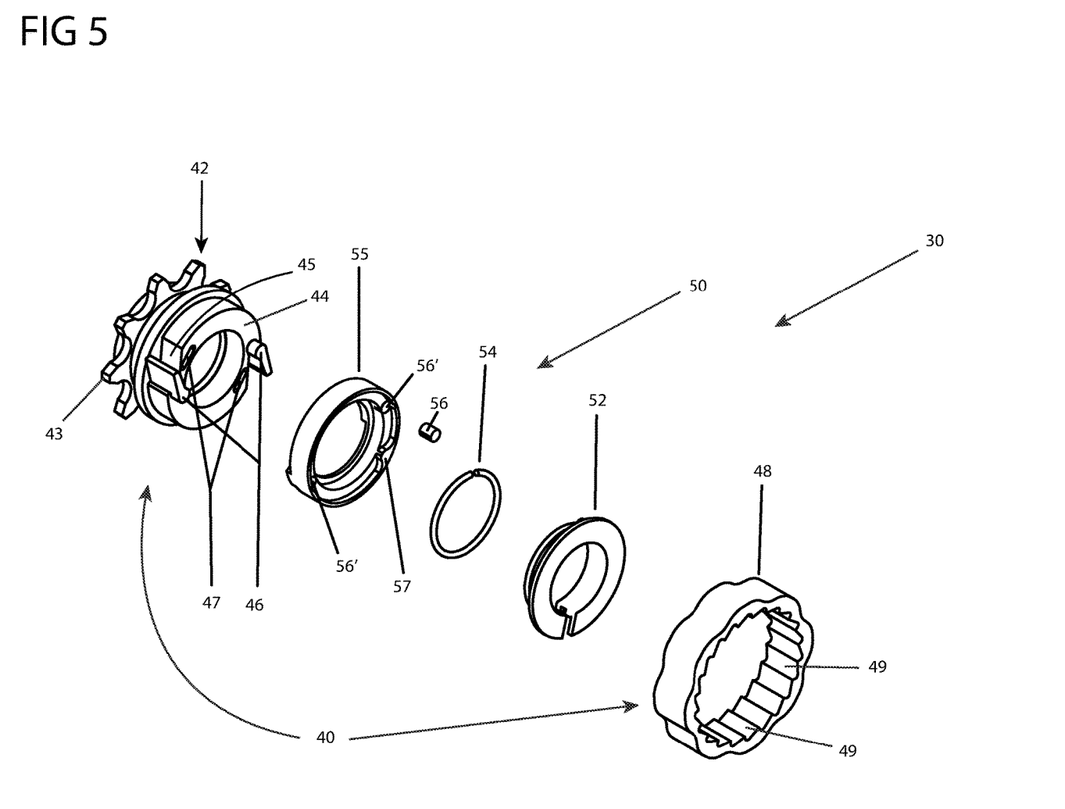
FIG. 5 is an exploded perspective view of the illustrative embodiment of a transmission assembly in accordance with FIG. 4 as seen from an opposite direction.

Turning next to the illustrative embodiment as shown in FIGS. 4 and 5, exploded perspective views of one embodiment of a transmission assembly 30 in accordance with the present invention, as viewed from opposite directions along an imaginary axis therethrough, are presented. As may be seen from FIGS. 4 and 5, a transmission assembly 30, in at least one embodiment, comprises a drive assembly 40. With continued reference to the illustrative embodiment of FIGS. 4 and 5, a transmission assembly 30 in accordance with the present invention further comprises an engagement assembly 50, which is disposable between an engaged orientation and a disengaged orientation.

Looking further to the illustrative embodiment of FIGS. 4 and 5, a drive assembly 40 in accordance with at least one embodiment of the present invention comprises a drive member 42. As may be seen throughout the figures, a drive member 42 in accordance with the present invention comprises a sprocket 43 disposed on one side thereof. More in particular, a drive member 42 comprises a sprocket 43 which is dimensioned to receive the portion of a bicycle chain at least partially there around and in a driving relation thereto.

Figure 6:
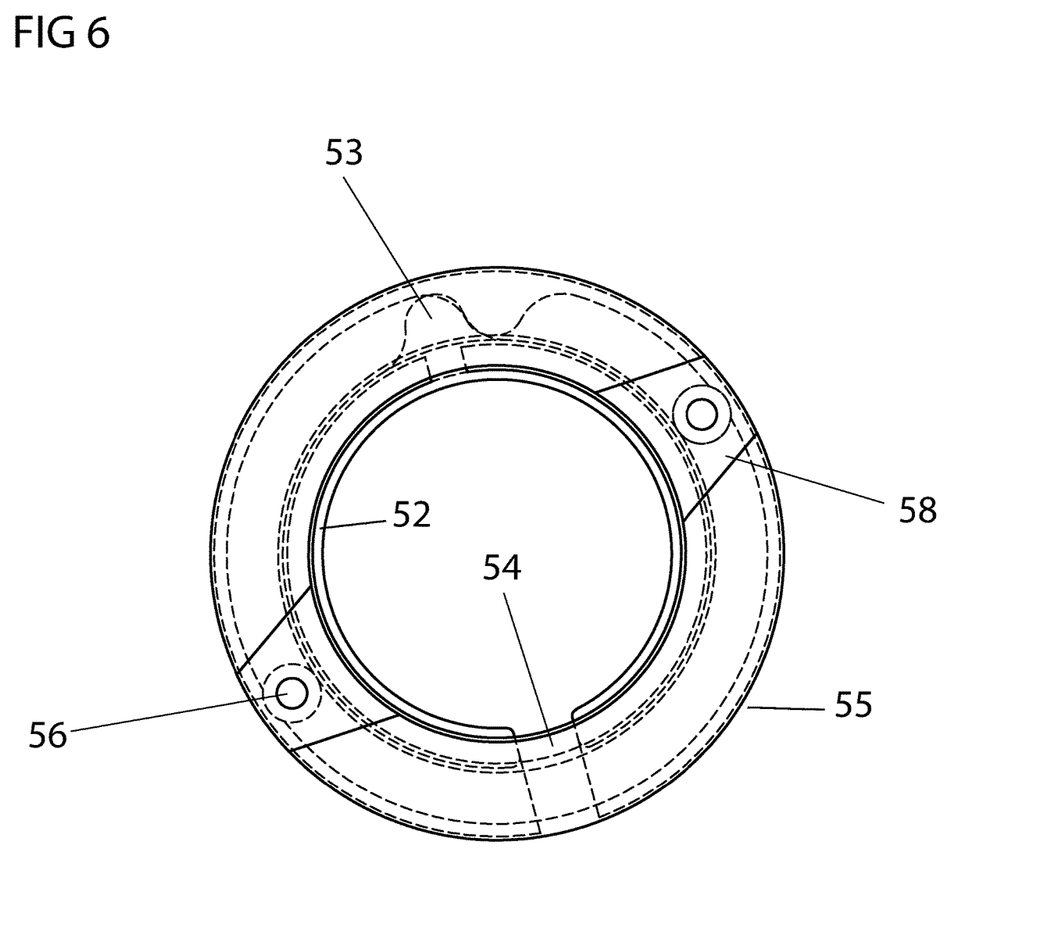
FIG. 6 is an exploded perspective view of one illustrative embodiment of a hub and a ratchet member in accordance with the present invention.

Looking again to the illustrative embodiment of FIGS. 4 and 5, a drive assembly 40 in accordance with the present invention further comprises a ratchet member 48. With reference to the illustrative embodiment of FIG. 6, in at least one embodiment, a ratchet member 48 comprises an outer periphery 48' which is configured and dimensioned to be operatively engage a receiving aperture 23' of a hub 23. More in particular, the operative engagement of the outer periphery 48' of the ratchet member 48 and the receiving aperture 23' of the hub 23 is maintained via a friction fit, such that movement of the ratchet member 48, such a rotational movement, will necessarily translate to movement of the rotation of the hub 23, once again, such a rotational movement.

With continued reference to the illustrative embodiment of FIGS. 4 and 5, in accordance with at least one embodiment of the present invention, a drive member 42 further comprises a pawl support member 44. In at least one embodiment, a pawl support member 44 is disposed on drive member 42 opposite a sprocket 43, such as is shown throughout the figures. A pawl support member 44 in accordance with at least one embodiment of the present invention comprises at least one pawl support slot 45. Further, a drive assembly 40 in accordance with at least one embodiment of the present invention comprises at least one pawl 46. More particular, the at least one pawl support slot 45 is configured and dimensioned to receive at least one pawl 46 operatively positioned therein. In at least one embodiment, the at least one pawl 46 is disposable between a retracted freecoaster orientation and an extended driving orientation, as discussed in further detail hereinafter.

Turning once again to the illustrative embodiment of FIGS. 4 and 5, a drive assembly 40 in accordance with at least one embodiment of the present invention comprises a plurality of pawls 46. As further shown in FIGS. 4 and 5, a pawl support member 44 in accordance with at least one embodiment of the present invention comprises a plurality of pawl support slots 45, wherein each of the plurality of pawl support slots 45 is dimensioned and configured to receive at least one pawl 46 operatively positioned therein. In at least one further embodiment, a drive assembly 40 in accordance with the present invention further comprises at least one pawl retention member 47. More in particular, in at least one embodiment, a pawl retention member 47 is operative to maintain at least one pawl 46 in the retracted freecoaster orientation, while an engagement assembly 50 is disposed in a disengaged orientation, as discussed in further detail below. In at least one further embodiment, the pawl retention member 47 is operative to maintain each of a plurality of pawls 46 in the retracted freecoaster orientation, once again, while an engagement assembly 50 is disposed in a disengaged orientation. In still one further embodiment, a drive assembly 40 comprises a plurality of pawl retention members 47. As may be seen in the illustrative embodiment of FIGS. 4 and 5, a drive assembly 40 in accordance with one embodiment the present invention comprises a plurality of pawl retention members 47, each corresponding to a different one each of a plurality of pawls 46.

In still one further embodiment, a pawl retention member 47 in accordance with the present invention is disposed in a pawl support member 44. In at least one embodiment, a pawl retention member 47 comprises a magnetic material of construction, and each corresponding pawl 46 comprises a sufficient amount of a metal in its construction such that the magnetic force exerted by pawl retention member 47 is sufficient to maintain the pawl 46 in the retracted freecoaster orientation, while an engagement assembly 50 is disposed in a disengaged orientation, once again, as discussed in further detail below.

Figure 2:
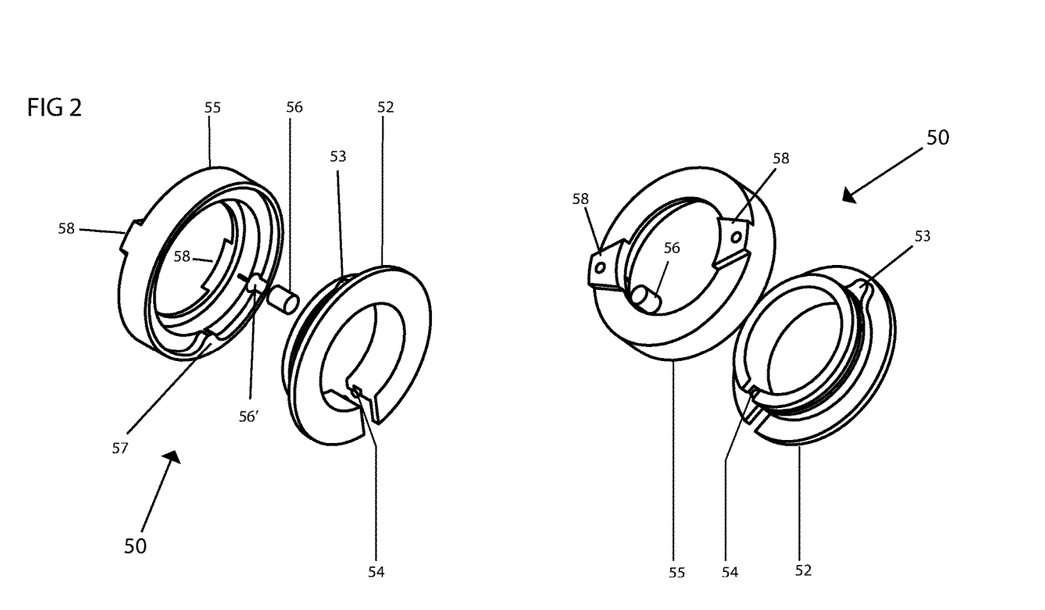
FIG. 2 presents exploded perspective views, front and rear, of one illustrative embodiment of an engagement assembly in accordance with the present invention.

As before, a transmission assembly 30 of a freecoaster hub system for a bicycle 100 in accordance with the present invention further comprises an engagement assembly 50. Turning once again to the illustrative embodiment of FIGS. 4 and 5, as well as the illustrative embodiment of FIG. 2, an engagement assembly 50 in accordance with at least one embodiment of the present invention comprises an inner member 52 and an outer member 55. With reference to the illustrative embodiments of FIGS. 1, 3A and 3B, a retention member 54 is provided in at least one embodiment so as to sufficiently secure an inner member 52 of an engagement assembly 50 to at least a portion of an axle 24 while the engagement assembly 50 is disposed between a disengaged orientation and an engaged orientation, in accordance with the present invention. While depicted in the figures as an O-ring type of mechanism, it will be appreciated by those of skill in the art that any of a number of mechanical fasteners may be utilized within the scope and intent of the present invention in order to sufficiently secure an inner member 52 to at least a portion of an axle 24. In at least one embodiment, inner member 52 is constructed of a material having a high coefficient of friction while in a static state which decreases considerably while in motion, such as, but not limited to acetal, DELRIN, or NYLON 66. In accordance with at least one embodiment, an outer member 55 of an engagement assembly 50 is disposed in a moveable relation to the inner member 52, and in at least one further embodiment, an outer member 55 of an engagement assembly 50 is disposed in a rotational configuration relative to an inner member 52.

In yet another embodiment, an outer member 55 of an engagement assembly 50 is disposed in a rotational configuration relative to an inner member 52, such that the inner member 52 and the outer member 55, and thus the engagement assembly 50 itself, are disposable between an engaged orientation and a disengaged orientation in accordance with the present invention. More in particular, an inner member 52 of an engagement assembly 50 comprises at least one inner stop 53, such as is shown best in the illustrative embodiment of FIG. 4. Further, as best seen in the illustrative embodiment of FIG. 5, in at least one embodiment, an outer member 55 comprises a fixed stop 57. Looking one again to the illustrative embodiment of FIG. 2, an outer member 55 comprises a fixed stop 57, and at least one slack adjustment pin slot 56'. An engagement assembly 50 in accordance with at least one embodiment of the present invention further comprises at least one slack adjustment pin 56 which is configured and dimensioned to be operatively positionable in at least one slack adjustment pin slot 56' of an outer member 55.

In at least one further embodiment, an outer member 55 of an engagement assembly 50 in accordance with the present invention comprises a plurality of slack adjustment pin slots 56' disposed there around. Further, at least one slack adjustment pin 56 is provided which is configured and dimensioned to be operatively positionable in each of the different ones of plurality of slack adjustment pin slots 56' of the outer member 55. As such, by selectively positioning a slack adjustment pin 56 in one of the plurality of slack adjustment pin slots 56', the distance or travel between a fixed stop 57 and an operatively positioned slack adjustment pin 56 may be quickly and easily varied by simply moving the slack adjustment pin 56 between the plurality of slack adjustment pin slots 56'.

More importantly, a slack engagement angle, which dictates the amount of slack a rider will experience between disengagement and engagement of the freecoaster hub system for a bicycle 100 in accordance with the present invention, is at least partially defined by the distance or travel between a fixed stop 57 and a slack adjustment pin 56 in an outer member 55 of an engagement assembly 50 in accordance with at least one embodiment of the present invention. Stated otherwise, slack is at least partially defined by the degrees of rotation the pedals of a bicycle must travel in a forward direction before an engagement assembly 50 of the present freecoaster hub system 100 rotates between a fully disengaged orientation to a fully engaged orientation. More in particular, once an engagement assembly 50 is disposed in an engaged orientation, further forward rotation of the pedals will cause a bicycle to be propelled in a forward direction. As will be appreciated by those of skill in the art, the provision of at least one slack adjustment pin 56 and a plurality of slack adjustment pin slots 56' in an outer member 55 of an engagement assembly 50 in accordance with the present invention permits quick and easy adjustment of the slack, without requiring the disassembly, and subsequent reassembly, of the entire freecoaster hub system for a bicycle 100 in accordance with the present invention. Rather, the slack may be quickly and easily adjusted by simply repositioning a slack adjustment pin 56 into an operative position in one of a plurality of slack adjustment pin slots 56' which results in a desired slack engagement angle, and therefore, provides a desired amount of slack.

In at least one embodiment of the present invention, an outer member 55 of an engagement assembly 50 comprises at least one pawl engagement tab 58. Looking again to the illustrative embodiments of FIGS. 1 and 2, in accordance with at least one embodiment of the present invention, an outer member 55 of an engagement assembly 50 comprises a plurality of pawl engagement tabs 58, each disposed on an outer surface thereof.

Figure 3:
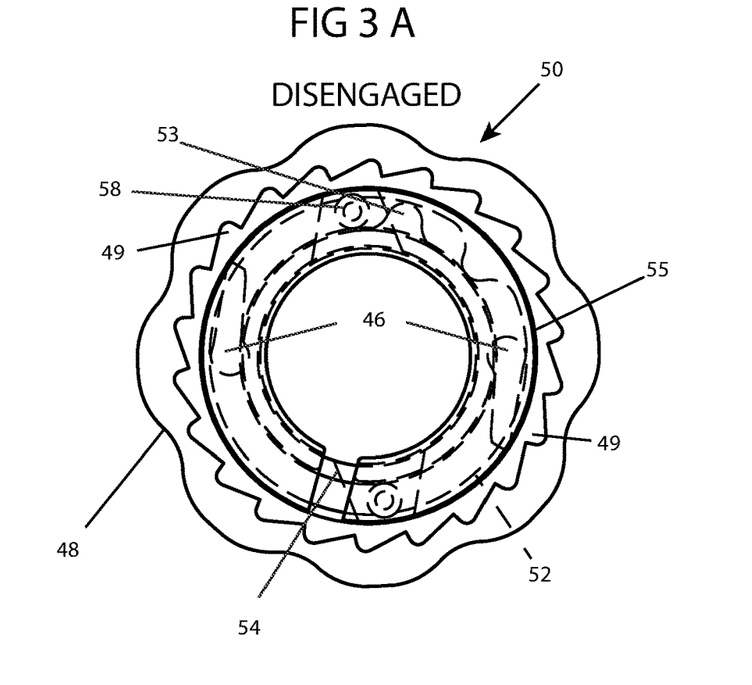
FIG. 3A presents views of one illustrative embodiment of an engagement assembly disposed in a disengaged orientation with respect to a ratchet member in accordance with the present invention.
FIG. 3B presents views of one illustrative embodiment of an engagement assembly disposed in an engaged orientation with respect to a ratchet member in accordance with the present invention.

Turning next to the illustrative embodiment of FIG. 3A, an engagement assembly 50 of a freecoaster hub system for a bicycle 100 in accordance with the present invention is depicted disposed in a disengaged orientation. More in particular, as may be seen from FIG. 3A, while in a disengaged orientation, an inner stop 53 of an inner member 52 is disposed in an adjacent and abutting relation to slack adjustment pin 56 operatively positioned in the outer member 55. As further shown in the illustrative embodiment of FIG. 3A, while disposed in a disengaged orientation, the first stop 53 of the inner member 52 is disposed in a spaced apart relation to the fixed stop 57 of the outer member 55.

As will be appreciated by those of skill in the art, depending on whether the present freecoaster hub system for a bicycle 100 is installed in a right side or a left side configuration on a bicycle, a disengaged orientation may be defined by an inner stop 53 of an inner member 52 disposed in a spaced apart relation to slack adjustment pin 56 operatively positioned in the outer member 55, while the first stop 53 of the inner member 52 is disposed in an adjacent and abutting relation to the fixed stop 57 of the outer member 55.

More importantly, while the engagement assembly 50 in accordance with the present invention is disposed in a disengaged orientation, such as is shown in the illustrative embodiment of FIG. 3A, the plurality of pawl engagement tabs 58 are disposed in a spaced apart and non-engaging relation to the corresponding plurality of pawls 46 which, as depicted in FIG. 3A, are disposed in a retracted freecoaster orientation. As such, while an engagement assembly 50 in accordance with at least one embodiment of the present invention is disposed in a disengaged orientation, the pawls 46 do not engage the ratchet member 48 of the drive assembly 40, and therefore, the wheel of the bicycle is free to rotate in either direction, forward or backwards, and likewise, the rider is free to coast in either direction, forward or backwards, while the engagement assembly 50 is disposed in a disengaged orientation, as shown in the illustrative embodiment of FIG. 3A.

Conversely, and with reference next to the illustrative embodiment of FIG. 3B, an engagement assembly 50 of a freecoaster hub system for a bicycle 100 in accordance with the present invention is depicted disposed in an engaged orientation. As may be seen from FIG. 3B, while in an engaged orientation, an inner stop 53 of an inner member 52 is disposed in an adjacent and abutting relation to fixed stop 57 of an outer member 55. As further shown in the illustrative embodiment of FIG. 3B, while disposed in an engaged orientation, the first stop 53 of the inner member 52 is disposed in a spaced apart relation to the slack adjustment pin 56 operatively positioned in the outer member 55.

As will be appreciated by those of skill in the art, depending on whether the present freecoaster hub system for a bicycle 100 is installed in a right side or a left side configuration on a bicycle, an engaged orientation may be defined by an inner stop 53 of an inner member 52 disposed in a spaced apart relation to fixed stop 57 of an outer member 55, while the first stop 53 of the inner member 52 is disposed in an adjacent and abutting relation to the slack adjustment pin 56 operatively positioned in the outer member 55.

More importantly, however, is that while the engagement assembly 50 in accordance with the present invention is disposed in an engaged orientation, such as is shown in the illustrative embodiment of FIG. 3B, the plurality of pawl engagement tabs 58 are disposed in an abutting relation to the corresponding plurality of pawls 46 which forces the plurality of pawls 46 from a retracted freecoaster orientation, as shown in FIG. 3A, into an extended driving orientation, as shown best in FIG. 3B. With continued reference to the illustrative embodiment of FIG. 3B, while the engagement assembly 50 is disposed in an engaged orientation, each of the plurality of pawls 46 is forced into an outwardly extended driving orientation by a corresponding one of the plurality of pawl engagement tabs 58 such that each of the plurality of pawls 46 is disposed into an operative driving engagement with the ratchet member 48 of the drive assembly 40. More specifically, while the engagement assembly 50 is disposed in an engaged orientation, each of the plurality of pawls 46 is forced into an outwardly extended driving orientation by a corresponding one of the plurality of pawl engagement tabs 58 such that each of the plurality of pawls 46 is disposed into an operative driving engagement with a different corresponding one of a plurality of pawl engagement slots 49 the ratchet member 48, once again, as shown best in the illustrative embodiment of FIG. 3B.

Therefore, while the engagement assembly 50 is disposed in an engaged orientation, as shown in the illustrative embodiment of FIG. 3B, forward rotation of the bicycle pedals translates into forward motion of the rear wheel thereby causing the bicycle to be propelled forward. More in particular, the bicycle pedals are interconnected to a pedal sprocket which is movable rotationally therewith. A bicycle chain is disposed around and operatively interconnects the pedal sprocket with the sprocket 43 of drive member 42 of a drive assembly 40 in accordance with the present invention. As will be appreciated by those of skill in the art, when a rider pedals in a forward direction, the pedal sprocket rotates in a forward direction, thereby causing the bicycle chain to be transported in a forward direction. The movement of the bicycle chain in a forward direction while engaging a sprocket 43 in a driving relation causes the drive member 42 of the drive assembly 40 to rotate in a forward direction as well. Finally, as a result of the interconnection of the drive assembly 40 and engagement assembly 50 of the transmission assembly 30 to the hub assembly 20, as described in detail above, the forward movement of the drive member 42 causes forward movement of the inner member 52 of the engagement assembly 50 into an engaged orientation with the outer member 55 of the engagement assembly 50. As a result, the plurality of pawls 46 are forced into an outwardly extended driving orientation and into an operative engagement with the pawl engagements slots 49 of the ratchet member 48, thereby causing the ratchet member 48 to rotate in a forward direction. Finally, the operative engagement of the ratchet member 48 with the hub 23 causes forward rotation of the hub 23, thereby causing forward motion of the rear wheel of the bicycle interconnected to the hub 23 via the plurality of spokes.

Conversely, as will also be appreciated by those of skill in the art, when a rider pedals in a backward direction, the pedal sprocket rotates in a backward direction, thereby causing the bicycle chain to be transported in a backward direction. The movement of the bicycle chain in a backward direction while engaging a sprocket 43 in a driving relation causes the drive member 42 of the drive assembly 40 to rotate in a backward direction as well. Finally, as a result of the interconnection of the drive assembly 40 and engagement assembly 50 of the transmission assembly 30 to the hub assembly 20, as described in detail above, the backward movement of the drive member 42 causes backward movement of the inner member 52 of the engagement assembly 50 into a disengaged orientation with the outer member 55 of the engagement assembly 50. As a result, the plurality of pawls 46 are released from the outwardly extended driving orientation into a retracted freecoaster orientation, thereby disengaging the pawl engagements slots 49 of the ratchet member 48, thereby allowing the freecoaster hub system 100, and the bicycle itself, to coast freely in either direction, backward or forward.

As will be appreciated by those of skill in the art, and with the exception of the components exhibiting magnetic properties as described hereinabove, the components of a freecoaster hub system for a bicycle 100 in accordance with the present invention may be constructed from any of a variety of appropriate materials including, but in no manner limited to, metals, metal alloys, engineered plastics, composite materials, etc., provided that the mechanical properties required for the proper performance of the various components within the freecoaster hub system for a bicycle 100 are met. Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A freecoaster hub system for a bicycle allowing the bicycle to coast freely in either a forward or backward direction, said system comprising:
   a hub assembly having a hub and an axle, said axle interconnected to said hub, and
   a transmission assembly at least partially mounted in said hub and operatively interconnected to said axle, said transmission assembly comprising a drive assembly and an engagement assembly,
   said drive assembly comprising a drive member operative with said axle, said drive member having a sprocket on one side dimensioned to receive a portion of a bicycle chain in a driving relation there around, a pawl support member on a side opposite of said sprocket, at least one pawl operatively positioned in said pawl support member, said at least one pawl disposable between a retracted freecoaster orientation and an extended driving orientation, and a ratchet member interconnected to said hub,
   said ratchet member comprising at least one ratchet slot dimensioned to receive a portion of said at least one pawl therein while said at least one pawl is disposed in said extended driving orientation, said at least one pawl engages said at least one ratchet slot while said at least one pawl is disposed in said extended driving orientation thereby causing said ratchet member to rotate in the forward direction while said drive member rotates in the forward direction, wherein rotation of said drive member and said ratchet member in the forward direction causes said hub and said axle to rotate in the forward direction thereby propelling the bicycle in the forward direction,
   said engagement assembly comprising an inner member and an outer member disposed in a rotational configuration relative to said inner member between an engaged orientation and a disengaged orientation,
   said inner member comprising an inner stop and said outer member comprising a fixed stop, said inner stop engages said fixed stop to limit rotation of said outer member, and said outer member further comprising a slack adjustment pin and at least one slack adjustment pin slot to receive a portion of said slack adjustment pin therein.

2. The system as recited in claim 1 wherein said inner stop engages said slack adjustment pin while said inner member and said outer member are disposed in said engaged orientation.

3. The system as recited in claim 2 wherein said outer member comprises at least one pawl engagement tab, said at least one pawl engagement tab forcing said at least one pawl from said retracted freecoaster orientation into said extended driving
   orientation while said inner member and said outer member of said engagement assembly are disposed in said engaged orientation.

4. A freecoaster hub system for a bicycle allowing the bicycle to coast freely in either the forward or backward direction, said system comprising:
   a hub assembly having a hub and an axle, said axle interconnected to said hub,
   a transmission assembly at least partially mounted in said hub and operatively interconnected to said axle,
   said transmission assembly comprising a drive assembly having a drive member operative with said axle,
   said drive member having a sprocket on one side dimensioned to receive a portion of a bicycle chain in a driving relation there around and a pawl support member on a side opposite of said sprocket,
   said drive assembly comprises a plurality of pawls operatively positioned in said pawl support member, each of said plurality of pawls disposable between a retracted freecoaster orientation and an extended driving orientation,
   said drive assembly further comprises a ratchet member interconnected to said hub,
   said ratchet member comprising a plurality of ratchet slots each dimensioned to receive a portion of a different one of said plurality of pawls therein while said plurality of pawls are disposed in said extended driving orientation, thereby causing said ratchet member to rotate in a forward direction,
   said transmission assembly further comprising an engagement assembly having an inner member and an outer member disposed in a rotational configuration relative to said inner member between an engaged orientation and a disengaged orientation, said inner member comprises an inner stop and said outer member comprises a fixed stop, said inner stop engages said fixed stop to limit rotation of said outer member, said outer member further comprises a slack adjustment pin and a plurality of slack adjustment pin slots, said slack adjustment pin disposable into any one of said plurality of slack adjustment pin slots, and said inner stop engages said slack adjustment pin while said inner member and said outer member are disposed in said engaged orientation, a slack engagement angle at least partially defined by a distance between said fixed stop and a preselected one of said plurality of slack adjustment pin slots in which said slack adjustment pin is disposed, and said slack engagement angle further defined by the degrees of rotation of a bicycle pedal between said disengaged orientation and said engaged orientation of said inner member and said outer member of said engagement assembly.

5. The system as recited in claim 4 wherein said drive assembly further comprises a plurality of pawl retention members disposed in said pawl support member, each said pawl retention member operative to maintain a corresponding one of said plurality of pawls in said retracted freecoaster orientation.

\* \* \* \* \*